United States Patent
Gan et al.

(10) Patent No.: US 12,535,870 B2
(45) Date of Patent: *Jan. 27, 2026

(54) POWER THROTTLING MECHANISM USING INSTRUCTION RATE LIMITING IN HIGH POWER MACHINE-LEARNING ASICs

(71) Applicant: Google LLC, Mountain View, CA (US)

(72) Inventors: Houle Gan, Santa Clara, CA (US); Thomas James Norrie, San Jose, CA (US); Gregory Sizikov, Sunnyvale, CA (US); Georgios Konstadinidis, San Jose, CA (US)

(73) Assignee: Google LLC, Mountain View, CA (US)

( * ) Notice: Subject to any disclaimer, the term of this patent is extended or adjusted under 35 U.S.C. 154(b) by 147 days.

This patent is subject to a terminal disclaimer.

(21) Appl. No.: 18/201,974

(22) Filed: May 25, 2023

(65) Prior Publication Data
US 2023/0297152 A1    Sep. 21, 2023

Related U.S. Application Data

(63) Continuation of application No. 16/818,493, filed on Mar. 13, 2020, now Pat. No. 11,720,158.

(51) Int. Cl.
*G06F 1/28*    (2006.01)
*G06N 20/00*   (2019.01)

(52) U.S. Cl.
CPC .............. *G06F 1/28* (2013.01); *G06N 20/00* (2019.01)

(58) Field of Classification Search
None
See application file for complete search history.

(56) References Cited

U.S. PATENT DOCUMENTS

| | | |
|---|---|---|
| 5,287,292 A | 2/1994 | Kenny et al. |
| 5,451,892 A | 9/1995 | Bailey |

(Continued)

FOREIGN PATENT DOCUMENTS

| | | |
|---|---|---|
| AU | 2012227209 A1 | 5/2013 |
| CN | 108292768 A | 7/2018 |

(Continued)

OTHER PUBLICATIONS

Office Action for Taiwanese Patent Application No. 109136273 dated Mar. 1, 2024. 5 pages.

(Continued)

*Primary Examiner* — Fahmida Rahman
(74) *Attorney, Agent, or Firm* — Lerner David LLP

(57) ABSTRACT

A system contains a machine learning application specific integrated circuit (ASIC) and a power supply unit. The power supply unit and the ASIC are configured to be in data communication through dedicated pins on the ASIC and the power supply unit. The power supply unit detects a present power consumption of the ASIC. Upon determining that a threshold condition has been met, the power supply unit, responsive to the condition sends a digital signal to the ASIC. The ASIC contains a synchronizer which synchronizes the digital signal to be consistent with the ASICs internal clock frequency. A chip manager the synchronized signal and other signals to generate a throttling mask. The throttling mask is sent to a sequencer of the ASIC, which then limits the instruction flow into the processing units of the ASIC based on the mask. This in turn limits the power being consumed by the ASIC.

17 Claims, 7 Drawing Sheets

(56) References Cited

U.S. PATENT DOCUMENTS

| | | | |
|---|---|---|---|
| 5,630,110 | A | 5/1997 | Mote, Jr. |
| 6,393,374 | B1 | 5/2002 | Rankin et al. |
| 6,564,332 | B1 | 5/2003 | Nguyen et al. |
| 6,714,891 | B2 | 3/2004 | Dendinger |
| 6,889,332 | B2 | 5/2005 | Helms et al. |
| 7,000,130 | B2 | 2/2006 | Adachi |
| 7,111,178 | B2 | 9/2006 | Rusu et al. |
| 8,412,962 | B2 | 4/2013 | Gaskins et al. |
| 10,114,435 | B2 | 10/2018 | Gendler |
| 10,255,231 | B1 | 4/2019 | Briggs et al. |
| 10,481,626 | B1 | 11/2019 | Tang et al. |
| 2014/0355158 | A1* | 12/2014 | Metzner ............. H04L 25/0282 361/63 |
| 2015/0268678 | A1 | 9/2015 | Yu et al. |
| 2017/0123467 | A1 | 5/2017 | Ignowski et al. |
| 2017/0364132 | A1 | 12/2017 | Gendler et al. |
| 2019/0173899 | A1 | 6/2019 | Tews et al. |
| 2019/0361510 | A1 | 11/2019 | Sparling |
| 2020/0174541 | A1 | 6/2020 | Bitan et al. |
| 2020/0310509 | A1 | 10/2020 | Gendler et al. |

FOREIGN PATENT DOCUMENTS

| | | |
|---|---|---|
| CN | 110678825 A | 1/2020 |
| CN | 110825213 A | 2/2020 |
| TW | 200620553 A | 6/2006 |

OTHER PUBLICATIONS

David Baba, Power Management Considerations For FPGAs and ASICs, 2004, 10 pages.
Extended European Search Report for European Patent Application No. 20211012.8 dated Jun. 1, 2021. 9 pages.
Office Action for Taiwanese Patent Application No. 109136273 dated Dec. 30, 2022. 6 pages.
Wikipedia, "Instructions per second", retrieved on Nov. 19, 2022 <https://en.wikipedia.org/wiki/Instructions_per_second>. 11 pgs.
Office Action for Chinese Patent Application No. 202011131012.X dated Oct. 18, 2023. 10 pages.

* cited by examiner

100

300

POWER THROTTLING MECHANISM USING INSTRUCTION RATE LIMITING IN HIGH POWER MACHINE-LEARNING ASICs

CROSS-REFERENCE TO RELATED APPLICATIONS

The present application is a continuation of U.S. patent application Ser. No. 16/818,493, filed Mar. 13, 2020, the disclosure of which is incorporated herein by reference.

BACKGROUND

As the use of machine learning (ML) applications has increased, so too has the need for ASICs which are configured to handle these applications. However, since the applications for which the ASICs are designed to handle are constantly evolving, the time period to design, test, and manufacturer an ASIC for a particular application is short, as too long of a delay may lead to the ASIC being outdated. Moreover, the systems with which the ASIC is designed to be used are often designed and manufactured ahead of the design and fabrication of the ASICs. While the design and manufacturing of the system may take into account estimations about the operating parameters of the ASIC, such as the amount of power required by the ASIC, these estimations may differ significantly from the actual operating parameters of the ASIC.

In instances when the power requirements of the ASIC go beyond the supply capacity of the system, continued operation of the ASIC may create a risk that the ASIC or power supply will overheat, potentially damaging the system and/or ASIC. To avoid these risks, the power supply may cease providing power to the ASIC when the power drawn by the ASIC goes beyond a level that the power supply may safely handle. Shutting down the ASIC may result in the loss of the job being executed by the ML-ASIC, reduced availability of computational power for the system, and wasted computation time, limiting the usefulness of the ASIC.

SUMMARY

One aspect of the technology provides a system including an integrated circuit (IC) die; a voltage regulator; the voltage regulator being connected to the IC die through a sense line, the voltage regulator being configured to measure a current load over the sense line, determine if the current load satisfied a threshold level indicative of an over current condition, and provide a signal indicating an over condition to the IC die upon determining the existence of an over current condition; the IC die being configured to limit, responsive to receiving the signal indicating an over current condition, a processing rate of the IC die according to a throttling mask wherein the throttling masks limits the rate of data to be processed by one or more processors in the IC die.

Another aspect of the technology provides a system with including any combination of: an integrated circuit (IC) die; a voltage regulator; the voltage regulator being connected to the IC die through a sense line, the voltage regulator configured to measure a current load over the sense line, determine if the current load satisfied a threshold level indicative of an over current condition, and provide a signal indicating an over condition to the IC die upon determining the existence of an over current condition; the IC die being configured to limit, responsive to receiving the signal indicating an over current condition, a processing rate of the IC die according to a throttling mask wherein the throttling masks limits the rate of data to be processed by one or more processors in the IC die; a dedicated communication line to communicate the signal indicating an over current condition; a sequencer, the sequencer configured to receive the signal indicating the over current condition; the sequencer configured to receive the synchronize the signal indicating the over current condition to an internal clock of the IC die; a chip manger, the chip manger configured to generate a throttling mask; the throttle mask being based on the signal indicating the over current condition; the sequencer being configured to limit the processing rate of the one or more processors in accordance with the throttling mask; the voltage regulator being configured to measure the current load at the IC die; the voltage regulator being configured to measure whether the current load of the processing rate is limited; the voltage regulator being configured to provide a second signal upon the voltage regulator determining the over current condition no longer satisfied the threshold level.

Another aspect of the technology provides a method to regulate the power usage of an integrated circuit (IC), the method including measuring, by a voltage regulator, a current load; determining, by the voltage regulator, that the current load satisfies a threshold level indicating an over current condition; providing, by the voltage regulator, a signal indicating the over current condition to the IC die; limiting, in response to the received signal, a processing rate of the IC die according to a throttling mask, the throttling mask limiting the rate of data to be processed by one or more processors in the IC die.

Another aspect of the technology provides a method including to regulate the power usage of an integrated circuit (IC), the method including any combination of measuring, by a voltage regulator, a current load; determining, by the voltage regulator, that the current load satisfies a threshold level indicating an over current condition; providing, by the voltage regulator, a signal indicating the over current condition to the IC; limiting, in response to the received signal, a processing rate of the IC die according to a throttling mask, the throttling mask limiting the rate of data to be processed by one or more processors in the IC die; the signal indicating the over current condition is provided to the IC via a dedicated communication line; the voltage regulator providing the signal indicating the over current condition to a sequencer of the IC; the sequencer being configured to synchronize the signal indicating the over current condition to an internal clock of the IC; the throttling mask being based on the signal indicating the over current condition; a sequencer of the IC limiting the processing rate of the one or more processors in accordance with the throttling mask; the voltage regulator measuring the current load at the IC; measuring, by the voltage regulator, the current load of the processing rate is limited; providing a second signal to the voltage regulator upon determining the over current condition is no longer satisfies the threshold level.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

This disclosure generally relates to dynamically throttling machine learning application specific integrated circuits (ML-ASICs). ML-ASICs draw their power from a power source, which may monitor the amount of power being demanded by the ML-ASIC. The ML-ASIC may also contain a sequencer that controls the flow of instructions to be processed by the ML-ASIC. During periods of high workloads, the ML-ASIC may draw more power from the power source. An increase in power drawn by an ML-ASIC may result in an increase of heat which could damage the ML-ASIC. To limit the amount of heat generated by the ML-ASIC, the sequencer may throttle the rate of instructions processed by the ML-ASIC. By throttling the ML-ASIC, the amount of power required for operation of the ML-ASIC may be reduced, thereby reducing the heat generated by the ML-ASIC and the risk of damage to the ML-ASIC from overheating. As described in more detail below, the throttling may be done in response to the power source sensing the ML-ASIC has crossed a threshold level.

The power source from which typical application specific integrated circuits (ASICs) draw power may have an Over Current Protection (OCP) threshold. The OCP threshold may correspond to an amount of power being requested by the ASIC. In this regard, upon the ASIC drawing current that exceeds the OCP threshold, the power source may cease power delivery to the ASIC. Without power available, the ASIC shuts down. This event is known as an OCP event. OCP events are used to prevent damage to an ASIC caused by consuming too much power. Although beneficial to prevent permanent damage to the ASIC, OCP events lead to the loss of all work done by the ASIC.

As described herein, through the use of regulator signals and the synchronization of these regulator signals, as well as through additional hardware, it may be possible for an ML-ASIC to safely run workloads without the risk of triggering an OCP event, even when processing an instruction set or workload which would otherwise cause the ML-ASIC to consume an amount of power which is higher than what the ML-ASIC was designed for.

Example Systems

Figure 1A:
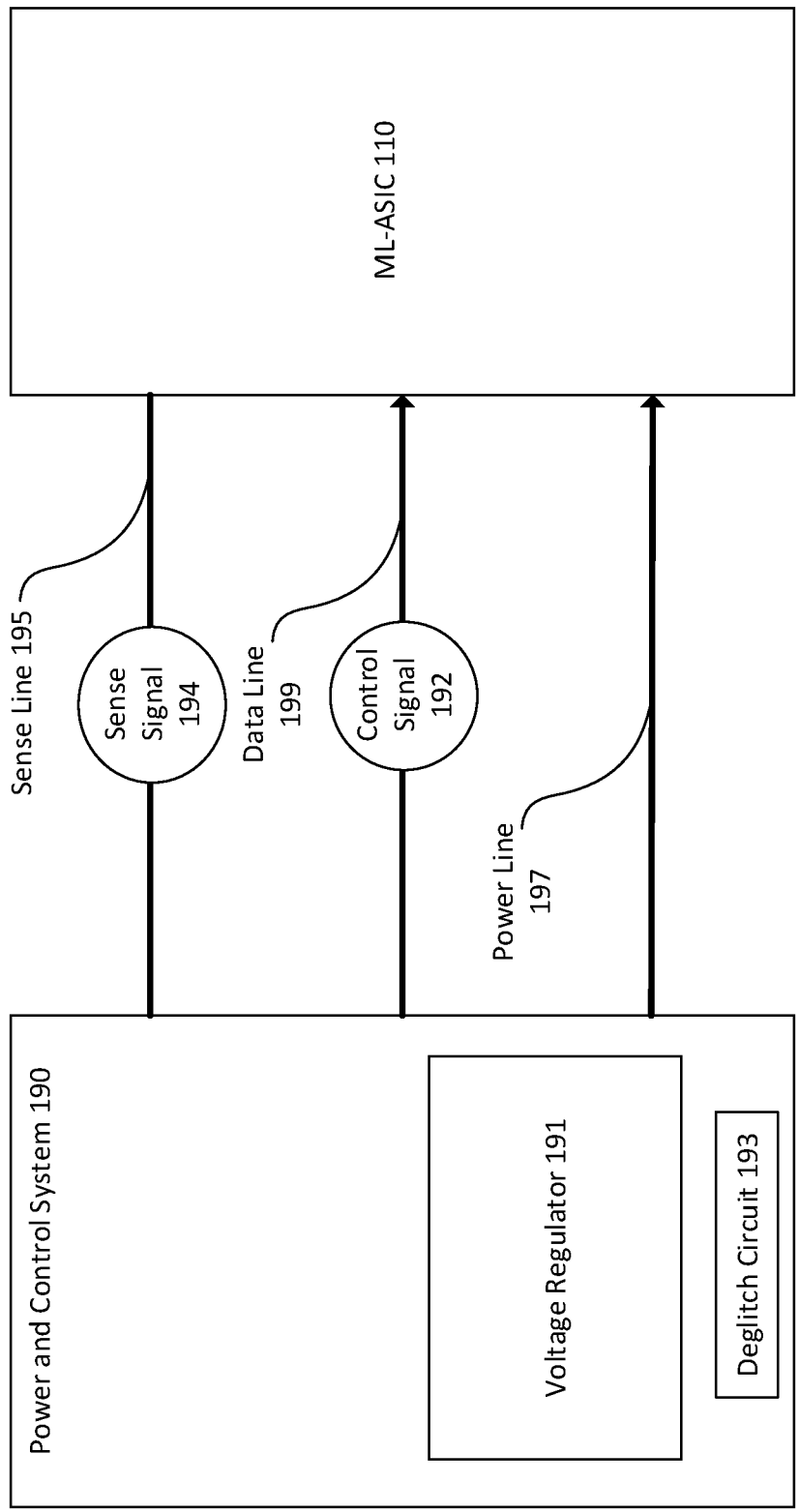
FIG. 1A is a block diagram of an example machine learning system according to aspects of the disclosure.
Figure 1B:
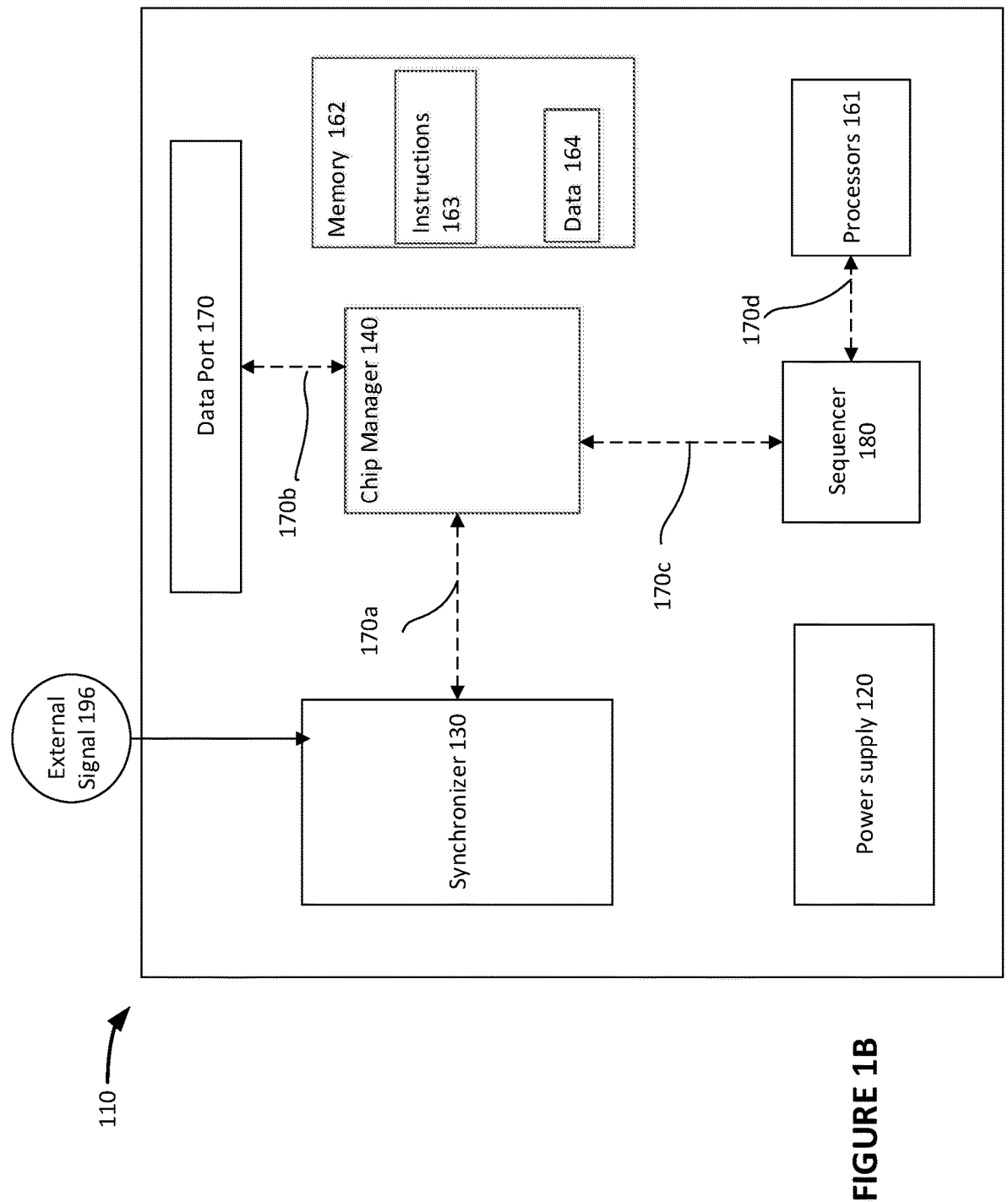
FIG. 1B is a block diagram of an example machine learning system according to aspects of the disclosure.

FIGS. 1A and 1B illustrate aspects and components of an example system 100. Referring to FIG. 1A, the system 100 includes an ML-ASIC 110 and a power and control system 190. The power and control system 190 and ML-ASIC 110 may be connected through various data lines and power supply lines, such as lines 195-199. Although FIGS. 1A and 1B illustrate a ML-ASIC, any type of processor, integrated circuit, or application specific integrated circuit may be used.

The power and control system 190 may provide power and control signals to the ML-ASIC 110. For instance, power may be delivered to the ML-ASIC 110 via power line 197 and control signals, such as control signal 192 described herein, may be delivered via data line 199. The power and control system 190 may also be configured to monitor the operation of the ML-ASIC. For instance, the power and control system 190 may monitor power usage of the ML-ASIC 110 provided by a sense signal 194 on sense line 195. The sense signal 194 may include the current, voltage, and/or wattage being drawn by the ML-ASIC 110. Although FIG. 1A illustrates lines 195-199 as three discrete lines, these lines may be combined into any combination of lines and/or number of lines. For example, the sense line 195 and the data line 199 may be the same line, while power line 197 remains separate. In this example, control signal 192 and sense signal 194 may be transmitted through the same line. In another example, power may be delivered via two discrete lines. Each line may be dedicated physical wires, traces, or other such interconnects attached via dedicated physical pins, solder joints, or other such connectors.

The power and control system 190 may include a voltage regulator 191 and deglitch circuitry 193. The voltage regulator 191 may be configured to control or otherwise limit the amount of power provided to the ML-ASIC 110 through power line 197. As described herein, the voltage regulator may monitor sense signal 194 received via sense line 195 for the amount of power being drawn by the ML-ASIC 110. For example, the sense signal 194 may include a continuous or nearly continuous analog or digital signal that indicates the current, voltage, and or wattage, being drawn from the voltage regulator 191 by the ML-ASIC 110.

The voltage regulator may send control signal 192 responsive to the monitored sense signal 194. In this regard, control signal 192 may be generated based on monitoring the amount of voltage, current, or power being transferred from voltage regulator 191 to the ML-ASIC 110. As described herein, the control signal 192 may be responsive to certain conditions, such as threshold conditions, being detected on the sense line 195 by the voltage regulator 191.

For example, the voltage regulator 191 may generate flags responsive to a pre-determined current level being exceeded by the ML-ASIC, as provided on the sense line 195. Responsive to the pre-determined current being exceeded, a flag, such as over current protection flag "OCP_FLAG" may be generated, set, or otherwise flagged in the voltage regulator. Upon generating an OCP_FLAG, the voltage regulator 191 may send a signal, such as control signal 192, to the ML-ASIC 110. The control signal 192 may cause the ML-ASIC 110 to throttle, or otherwise limit the amount of processing it executes, thereby causing the ML-ASIC 110 to draw less power, eventually reversing the condition that caused the OCP condition, as further described herein. More than one or a series of control signals may be sent by the voltage regulator 191 and/or power and control system 190 to the ML-ASIC 110. In other examples, the voltage regulator may reduce the amount of power provided to the ML-ASIC when a flag is set.

The OCP_FLAG may be set for at least a pre-determined amount of time, such as 10, 20, or 50 nanoseconds (ns). A flag may be reset or unflagged after checking that the condition that caused the flag to be set has not occurred in a pre-determined amount of time, such as a fixed number of nanoseconds (ns) or microseconds (μs). Once the flag is removed, the voltage regulator may stop sending control signal 192 to ML-ASIC 110, thereby allowing ML-ASIC 110 to gradually restore power. In other examples, voltage regulator 191 may send a new control signal which is configured to instruct the ML-ASIC 110 that the pre-determined current is no longer being exceeded, and that ML-ASIC may gradually restore power.

In some instances, OCP_FLAGs have may have different criteria for being set and unset. For example, three flags—OCP_FLAG_1, OCP_FLAG_2, and OCP_FLAG_3—may each be set after different, or the same, overcurrent or overvoltage conditions are met by the ML-ASIC 110. These flags may have different data structures, such as a different bit length, or a different encoding to include different types or amounts of information in each level of the flag and thereby control the operation of the ML-ASIC in different ways.

Voltage regulator 191 may also contain a deglitch circuit 193 to deglitch a status change that may generate a glitch from the analog signal, such as an analog signal arriving over sense line 195. A glitch may occur in an analog to digital circuit, in which an analog signal not intended to be detected produces a false positive in an analog to digital convertor. The monitored sense signal can be noisy and contain pulses of short duration which could falsely trigger the OCP_FLAG. A generator may also be included in deglitch circuit 193 which may generate a response to an output of the detector detecting a glitch, to suppress the glitch, and additional circuitry which may cancel the glitch. For example, deglitch circuit 193 can filter out the noisy or other such pulses capable of falsely triggering the OCP_FLAG by using a filter or a hysteresis circuit. In some instances, the deglitch circuit 193 can use a timed circuit which requires a signal to be above a threshold for a predetermined amount of time in order to be registered and trigger the OCP_FLAG. A combination of filters and circuits can be used by deglitch circuit 193. Although illustrated as separate components, the voltage regulator 191 and deglitch circuit 193 may be packaged in one unit.

Referring to FIG. 1B, ML-ASIC 110 includes a power supply unit 120, a synchronizer 130 capable of receiving signals, such as external signal 196, a chip manager 140, processors 161, memory 162, instructions 163, data 164, a data port 170, and a sequencer 180.

The power supply 120 may receive electrical power from the power and control system 190 via power line 197. Power supply 120 may provide power to the other components of the ML-ASIC 110, such the processors 161 and synchronizer 130.

The synchronizer 130 is able to receive a signal, such as control signal 192, from voltage regulator 191 and synchronize the signal to the internal clock of ML-ASIC 110.

ASICs generally use linear computational techniques. An ASIC generally has a clock speed or clock rate, which is based on the frequency of its processor. ASICs also generally have a clock period which is the inverse of the clock speed. The clock period is the interval between processing one set of instructions and the next. Increasing the clock speed increases the amount of work or processing that may be accomplished by the ASIC in a period of time [defined by the clock speed], and in turn decreases the clock period. Different ASICs may have different clock speeds, and thus, have a different clock period. Other ASICs may have a variable clock speed which can change the clock period for that ASIC. As the clock period is the fundamental period or minimal time interval in which an ASIC may respond to instructions, signals arriving asynchronously will not be processed properly.

It may be necessary to synchronize signals external to the ASIC to those internal to the ASIC, to bring the two signals in phase such that they are processed by the processors of the ASIC together as intended.

Thus, a signal from outside of the ML-ASIC, such as control signal 192, would be "out of phase" or on a different clock than signals which are internal to ML-ASIC 110. Thus, it is necessary to synchronize these external signals using synchronizer 130. Synchronizer 130 can also, after synchronizing a signal, send the synchronized value (produced by the synchronizer) elsewhere within the ML-ASIC. The synchronizer may also receive other external signals, which originate from a source outside both power and control system 190 and ML-ASIC 110, such as external signal 196. The external signal may be generated by software, or may be a signal which is generated responsive to environmental conditions in which the ML-ASIC 110 exists. As explained further below, it may be necessary to integrate or compile control signal 192 with signals internal to the ASIC. Thus, synchronizer 130 may ensure that the control signal and signals internal to the ASIC are "in phase".

Further, an ASIC may also have internal "flip-flop" circuits, S-R circuits, or D latch circuits, which only respond to data inputs during a time window when the data input is activated or allowed. A signal arriving too close to the end of this window can change the input signal towards the end of the input time window and cause such circuits to behave incorrectly. This can in turn cause such circuits to stop behaving digitally and instead cause them to have an undefined output. Thus, it may be necessary to synchronize a single signal arriving at the ML-ASIC to ensure that the signal is not being sampled at an incorrect point in the input time window. Synchronization ensures that the signal is properly interpreted and that the input signal does not cause unexpected or undefined behavior, which could lead to stability problems with the ML-ASIC. An external signal, such as control signal 192, can be synchronized to avoid these problems. In some examples, it may also be necessary to synchronize the signal to avoid an undefined output due to sampling the input signal at an incorrect point relative to the input time window. In other examples, synchronizer 130 can send a synchronized value produced by it elsewhere in ML-ASIC 110.

ML-ASIC 110 also contains a chip manager 140, which may operate as a central control unit for the ML-ASIC 110. In this regard, the chip manager 140 controls various aspects of the ML-ASIC 110, such as for example its instruction rate. As shown in FIG. 1 in dotted lines, chip manager 140 is in data communication with various components of the ASIC, such as the synchronizer 130.

This instruction executed by the ML-ASIC may be controlled by sequencer 180. In this regard, and as described in detail herein, the sequencer 180 may reduce or throttle the flow of instructions to processors 161, described herein. In some instances, sequencer 180 may be a part of the ML-ASIC and/or the processors 161 that control the flow of instructions according to a throttle mask, described herein.

The one or more processors 161 may be any conventional processors, such as commercially available microprocessors or specially adapted integrated circuits. Processors 161 may be configured to process instructions based on a received instruction flow from the sequencer 180.

Memory 162 may store information that is accessible by the processors 161, including instructions 163 that may be executed by the processors 161, and data 164. The memory 162 may be of a type of memory operative to store information accessible by the processors 161, including a non-transitory computer-readable medium, or other medium that stores data that may be read with the aid of an electronic device, such as a hard-drive, memory card, read-only memory ("ROM"), random access memory ("RAM"), as well as other write-capable and read-only memories. The subject matter disclosed herein may include different combinations of the foregoing, whereby different portions of the instructions 163 and data 164 are stored on different types of media.

Data 164 may be retrieved, stored or modified by processors 161 in accordance with the instructions 163. For instance, although the present disclosure is not limited by a particular data structure, the data 164 may be stored in computer registers, in a relational database as a table having a plurality of different fields and records, XML documents, or flat files. The data 164 may also be formatted in a computer-readable format such as, but not limited to, binary values, ASCII or Unicode. Moreover, the data 164 may comprise information sufficient to identify the relevant information, such as numbers, descriptive text, proprietary codes, pointers, references to data stored in other memories (including other network locations) or information that is used by a function to calculate the relevant data. Data 164 may also contain instructions or instruction sets which are received by ML-ASIC 110 to process.

The instructions 163 may be algorithms which are selectively invoked or executed by the ML-ASIC 110. For example, the instructions may be algorithms which outline how certain commands are executed on ML-ASIC 110. Instructions 163 may also be integrated into various components of the ASIC to perform functions described within this disclosure.

Data port 170 may be a physical port which allows for input and/or output of data from the ML-ASIC 110. For example, data port 170 may send and receive commands or computations for ML-ASIC 110 to respond to.

Also illustrated in FIG. 1B in dotted lines are informational pathways through which components within an ML-ASIC communicate, such as pathways 170a-170d. For example, chip manager 140 and sequencer 180 may communicate with one another via pathway 170a, chip manager 140 and data port 170 may communicate via pathway 170b, chip manager 140 and sequencer 180 may communicate via pathway 170c, and sequencer 180 and processors 161 may communicate via pathways 170d. Although only four pathways are shown in FIG. 1B, other pathways between components may be included in the ML-ASIC 110. A person of skill in the art would understand that these pathways may be integrated into the ASIC or achieved through dedicated interconnects and connectors.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 2:
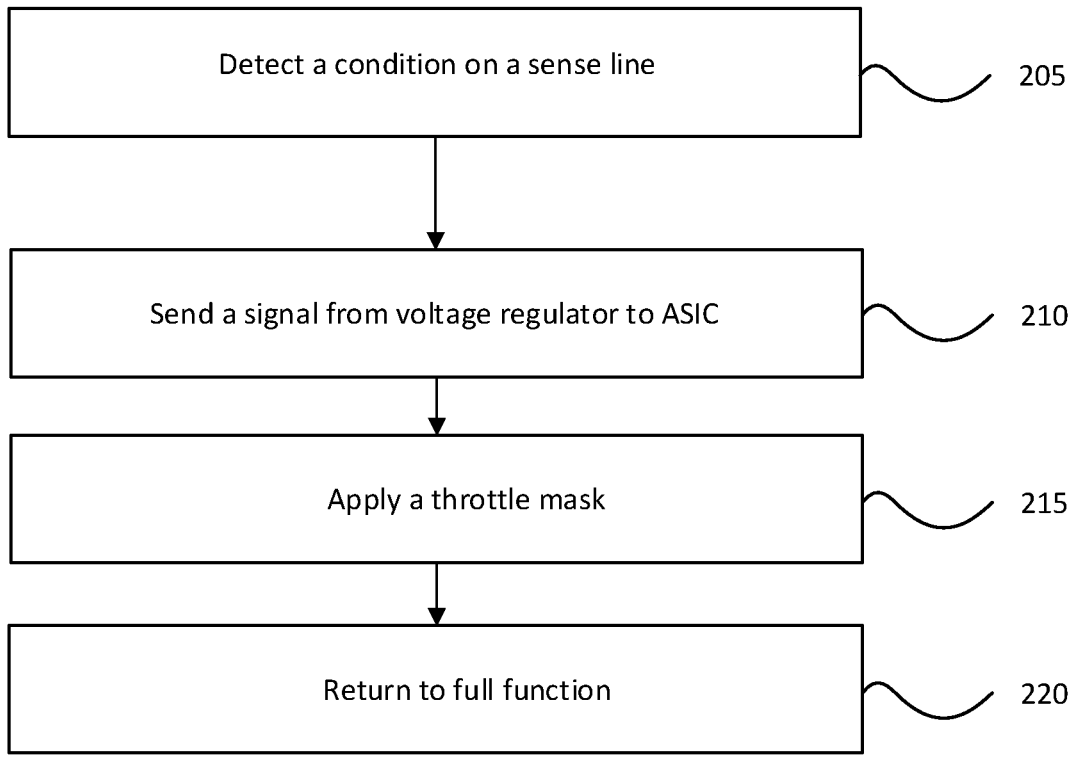
FIG. 2 is a flowchart 200 illustrating the dynamic throttling of an ML-ASIC.

FIG. 2 is a flowchart 200 illustrating the dynamic throttling of an ML-ASIC, such as ML-ASIC 110. At block 205, a voltage regulator, such as voltage regulator 191 may monitor sense line 195 for sense signals 194 indicative of a threshold condition being satisfied. For example, a threshold condition may be excessive current or voltage being drawn by the ML-ASIC 110.

In response to detecting a threshold condition, the voltage regulator 191 may send a signal, such as control signal 192 to ML-ASIC 110, as shown in block 210. In some instances, prior to sending a control signal, the voltage regulator 191 may generate an OCP_FLAG, as discussed here. Setting the OCP_FLAG may trigger a control signal 192 to be sent to the ML-ASIC 110. The control signal 192 may be a digital signal, which allows for more granularity and precision in the instructions being sent to the ML-ASIC 110 than an analog signal. The control signal may be preconfigured to be understood by ML-ASIC 110 and may be sent repeatedly in fixed time intervals or constantly asserted by the voltage regulator 191. For example, the asserted signal may be programmed signal, such as a "STOP" or "BRAKE" signal, which may be configured by the ML-ASIC 110 to stop further processing. In some examples, it is possible for the voltage regulator to send different signals based on the specific conditions being sensed in the sense line. In other examples, control signal 192 may be chosen from a set of pre-determined signals based on the sensed condition.

In response to the control signal 192, the ML-ASIC 110 may apply a throttle mask, as shown in block 215. As described herein, the throttle mask may be a series of steps taken by the ML-ASIC 110 to limit the processing being performed by processors 161, thereby limiting the power draw of the ML-ASIC.

Figure 3:
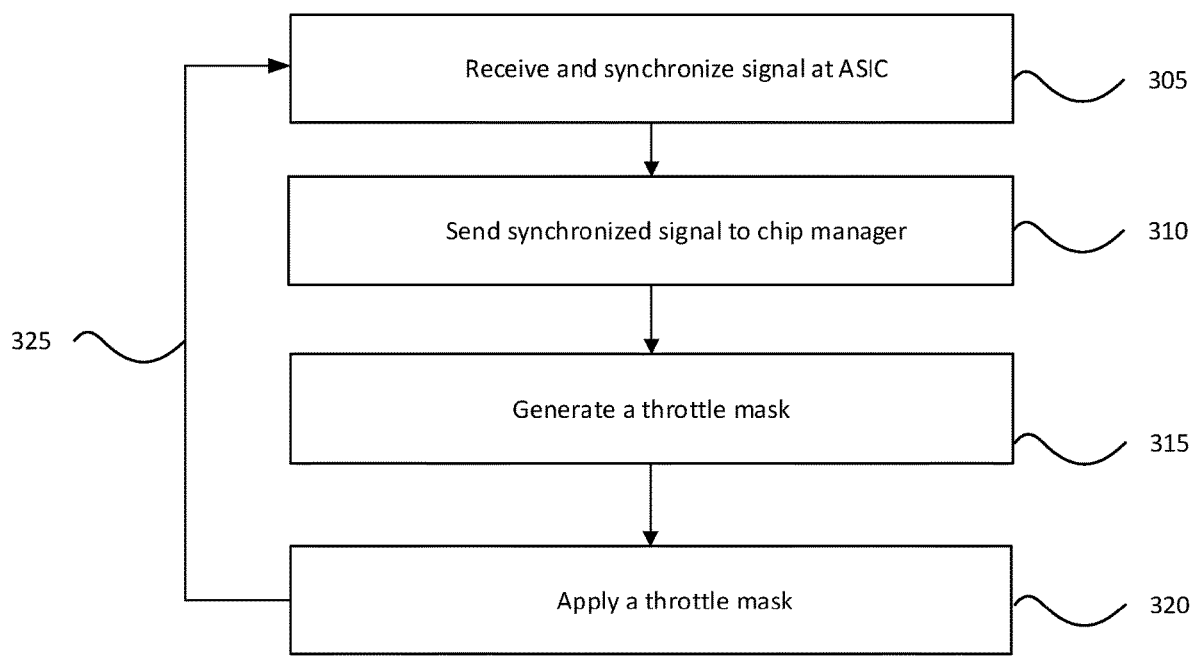
FIG. 3 is a flowchart further illustrating dynamic throttling performed by an ML-ASIC in accordance with aspects of the disclosure.

FIG. 3 illustrates a flowchart 300 outlining the steps performed by a ML-ASIC 110 upon receiving a control signal 192. In this regard, upon receiving a control signal 192, synchronizer 130 may synchronize the control signal 192 which is external to ML-ASIC 110, to a core clock domain of ML-ASIC 110. An external analog signal, such as control signal 192, may arrive between or at the edge of two clock periods. The external analog signal needs to be synchronized to internal clock signals so that it can be translated into a digital signal for processing by the ML-ASIC 110. It may also be necessary to synchronize the external analog input signal to avoid an undefined output due to sampling the external analog input signal at an incorrect point relative to the input time window. By synchronizing the control signal 192, throttling of the ML-ASIC may occur on the scale of nanoseconds, and thus achieve high efficiency from an ML-ASIC while still protecting the ASIC from over current or overpower events.

At block 310, the synchronizer 130 may communicate the received control signal 192, or a signal generated by the synchronizer responsive to the received control signal 192, to chip manager 140.

At block 315, a throttle mask may be generated by the chip manager 140. The throttle mask may throttle or otherwise reduce the instruction flow of the processors 161 of the ML-ASIC. The generated throttle mask may maintain the ML-ASIC 110 within predefined parameters to ensure that power usage is within predefined threshold. For example, the throttle mask may ensure that the voltage received by ML-ASIC 110 is always within an upper and lower bound, and that a minimum amount of power is always supplied to the ML-ASIC by the voltage regulator 191.

Chip manager 140 may contain various algorithms to generate the throttle mask. In some examples, the throttle mask may be a series of steps, with each step defining a limit to the number of instructions processors 161 may execute in a particular period. In some examples, distinct masks could be generated for or applied to specific functional units of ML-ASIC 110, such as a mask of floating point units, integer units, or vector units, so that only some of the elements or components within ML-ASIC 110 would be disabled or throttled on a given mask cycle. In some examples, a throttle mask may be a throttle percentage, where the percent counts down cycles to stall the operation of the ML-ASIC without specifically generating an encoded mask. In some examples, a throttle mask may be a binary string, such as "11110011", where a "1" would indicate that chip run normally, while the "0" indicates that the chip run at a "no operation" or idle. Each "1" or "0" within the throttle mask can indicate a duration equivalent to one clock cycle of the ML-ASIC, so that, a "1" would indicate one cycle where the chip is running while the "0" indicates one cycle where the chip is idling. In this example binary string as there are two "0"s and six "1"s, the string indicates an overall throttling rate of 2/8, or 25%. In other examples, the throttle mask can be a binary string which is a longer or shorter string length.

Chip manager 140 may also aggregate other digital signals which are internal to ML-ASIC 110. For example, ML-ASIC 110 may also generate a digital signal or indicator flag to indicate that the ASIC is running too hot. In one example, the ML-ASIC 110 may generate a digital signal, such as "PROC_HOT" to indicate that the processor in ML-ASIC 110 is running hot. As this signal is generated within ML-ASIC 110, the synchronizer 130 need not synchronize it to the clock of ML-ASIC 110. In some examples, the synchronizer may first receive all the signals before they are relayed to chip manager 140.

Multiple external signals may be received by multiple synchronizers. The synchronizes may then be relayed to chip manager 140. This enables synchronizer 130 to synchronize one or more external signals and allow throttle masks to be generated by the chip manager 140 which better correspond with the real-time conditions in which the ML-ASIC is operating. The throttle mask generated by the chip manager 140 may incorporate information from multiple sources or throttling requests, including hardware and software requests, such as control signal 192, an internal ASIC signal, such as PROC_HOT, or other software requests which may be received through data port 170. The other software requests may be different than external signal 196 and may indicate information which is separate or additional to the power control of the ML-ASIC. Chip manager may send the generated mask to a sequencer to apply the mask.

As shown at block 320, the generated throttle mask may be applied by the sequencer 180. In this regard, the sequencer 180 may regulate the instruction flow to the processors 161 in accordance with the throttle mask. As discussed, the generated throttle mask may include a series of steps which limit the instruction rate of the processors 161. The sequencer 180 may be any functional block or component which handles instruction flow to a processor, such as a CPU, a GPU, or a TPU.

As shown by arrow 325, steps 305 to 320 may be repeated. For example, if a particular condition to stop the throttling is not met, the throttling may continue or be re-calculated with another mask. In some examples, the particular condition may be a "release" signal received by the ML-ASIC 110 from the power and control unit 190. In other examples, it may be another external signal received by the ML-ASIC 110. By applying a throttling mask, the ML-ASIC 110 may continue operation without being shut down, while allowing the workflow being processed by the ML-ASIC to continue without overheating or damaging the ML-ASIC 110 or voltage regulator 191.

Referring to block 220 of FIG. 2, the ML-ASIC 110 may be restored to full function as full power is restored. This may occur in a step-wise manner after the throttle mask is de-asserted. For example, a percentage of the instruction rate may be restored in a series of steps. A pre-determined or dynamic waiting period may be set after each step, to ensure that the same over current condition is not recreated. For example, a series of 8, 16, or 32 steps may be taken with a fixed waiting period between the steps. During this time, the sense line may continue to be monitored by the voltage regulator 191 to confirm voltage, current, or power draw by the ML-ASIC 110 does not match a threshold condition. If a step does cause a threshold condition to be met, the instruction rate of the previous step may be reestablished until the power or current condition stabilizes. This process is illustrated further with reference to FIG. 6, described herein.

Figure 4:
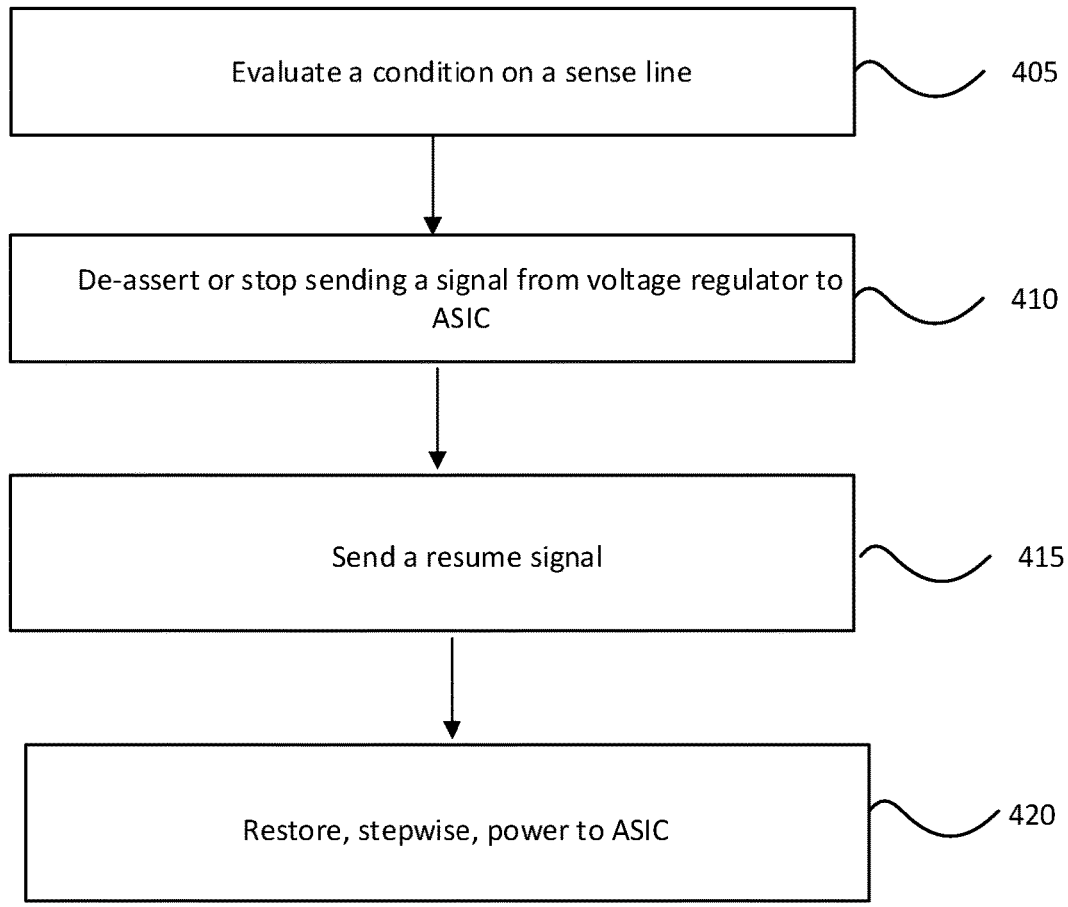
FIG. 4 is a flowchart illustrating the return of an ML-ASIC to a normal state of operation according to aspects of the disclosure.

FIG. 4 illustrates a flowchart 400 outlining the return of an ML-ASIC to its previous state of operation without a throttle mask applied. At block 405, the voltage regulator 191 may evaluate the sense line for sense signals indicating that the threshold condition is no longer met. In some examples, block 405 will not take place until a pre-determined time period after the first step. If it is determined that the threshold condition causing the control signal 192 to be generated and sent from voltage regulator 191 is no longer existing, the voltage regulator may now stop the generation and/or sending of the control signal 192.

At block, 410, the control signal 192, may be de-asserted by the voltage regulator if a control signal is determined to not be required as shown in block 405. At this step, the control signal sent by the voltage regulator 191 may no longer be sent.

At block 415, a resume signal may be sent by voltage regulator 191 to ML-ASIC 110 to restore a previous operational state of the ML-ASIC. The resume signal may be a signal sent over data line 199. The resume signal may be similar to control signal 192. In some embodiments, not receiving a control signal 192 may be interpreted by sequencer 130 as being equivalent to a resume signal. In other examples, it is possible to send a different digital signal to inform the synchronizer that the condition causing the throttle mask to be generated no longer exists. Thus, the throttle mask may stop being applied, or gradually be de-asserted. In other examples, the signal may be de-asserted only when voltage regulator 191 detects that the power demanded by ML-ASIC 110 has sufficiently decreased. In some examples, control signal 192 may also be de-asserted or stopped being sent by the voltage regulator upon the voltage regulator determining that the particular criterion which caused the signal to be sent is no longer present for at least a pre-determined period of time. In some examples, control signal 192 may stopped being sent once voltage regulator detects that the ASIC current demand is below a threshold for at least a pre-determined period of time, such as 100 ns.

At block 420, power may be restored by the voltage regulator 191. This may occur in a step-wise manner after the throttle mask is de-asserted. In some examples, the throttle mask is de-asserted after the ML-ASIC 110 receives a resume signal. In other examples, after not receiving a control signal 192 for a pre-determined period of time, the synchronizer begins to take steps to de-assert the throttle mask. In some examples, the throttle mask may be de-asserted as a percentage of the instruction rate may be restored in a series of steps. A pre-determined or dynamic waiting period may be set after each step, to ensure that the same over current condition is not recreated. For example, a series of 8, 16, or 32 steps may be taken with a fixed waiting period between the steps. During this time, the power or current conditions may be monitored. If a step does cause a power or current condition to react unexpectedly, the instruction rate of the previous step may be reestablished until the power or current condition stabilizes.

The steps described in methods 200-400 may also be combined with or used in combination with other current control techniques. For example, other techniques may be implemented at block 320, such as gating clock cycles or adjust phased-locked loop (PLL) settings. Although these other techniques have advantages, they may create a mismatch in the timing of instructions being processed by the ASIC and/or downstream effects of introducing noise on the power rail. Yet, these techniques may be optionally combined with the application of a throttle mask.

Figure 5:
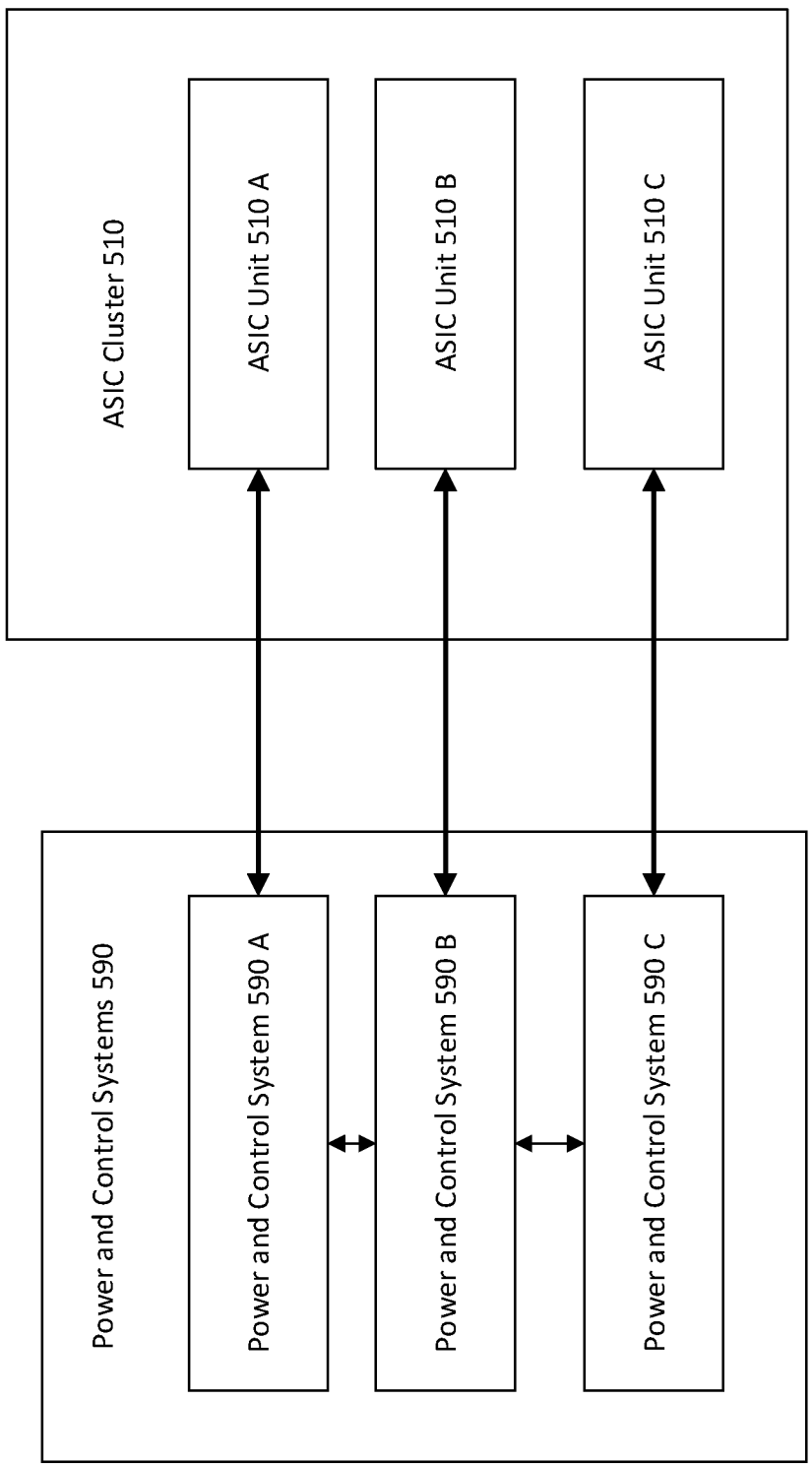
FIG. 5 is a block diagram of an example machine learning system cluster according to aspects of the disclosure.

FIG. 5 illustrates a system 500 including a cluster of power and control systems 590 and an ASIC cluster 510. ASIC Cluster 510 consists of ASIC unit 510 A, ASIC unit 510 B, and ASIC unit 510 C. Similarly, power and control system 590 consists of power and control system 590 A, power and control system 590 B, power and control system 590 C. Although only three ASIC units and three power and control systems are shown in FIG. 5, any number of ASIC units and power and control units may be used. As shown in FIG. 5, each power and control system may correspond to and provide power to a single ASIC unit, although a power and control system 590 may be a single system which provides power to multiple ASIC units. In some examples, it is possible to use the techniques described above in a series or combination of ASIC units, such as ASIC unit 110. For example, several power and control systems, such as power and control system 590 A, power and control system 590 B, and power and control system 590 C, may be connected with one another to be aware of the instruction rates and real-time power consumption of their respective ASIC units. When one power and control system determines an over power event occurring in its corresponding ASIC unit, it is possible for the other power and control systems to pre-emptively throttle the instruction rates corresponding to their ASIC units using the methods above. In some examples, the determination of whether to pre-emptively throttle may be accomplished through a probabilistic model, where the model uses a quantitative representation of the intensity or rate of instructions which are likely to be processed by the ASIC.

Figure 6:
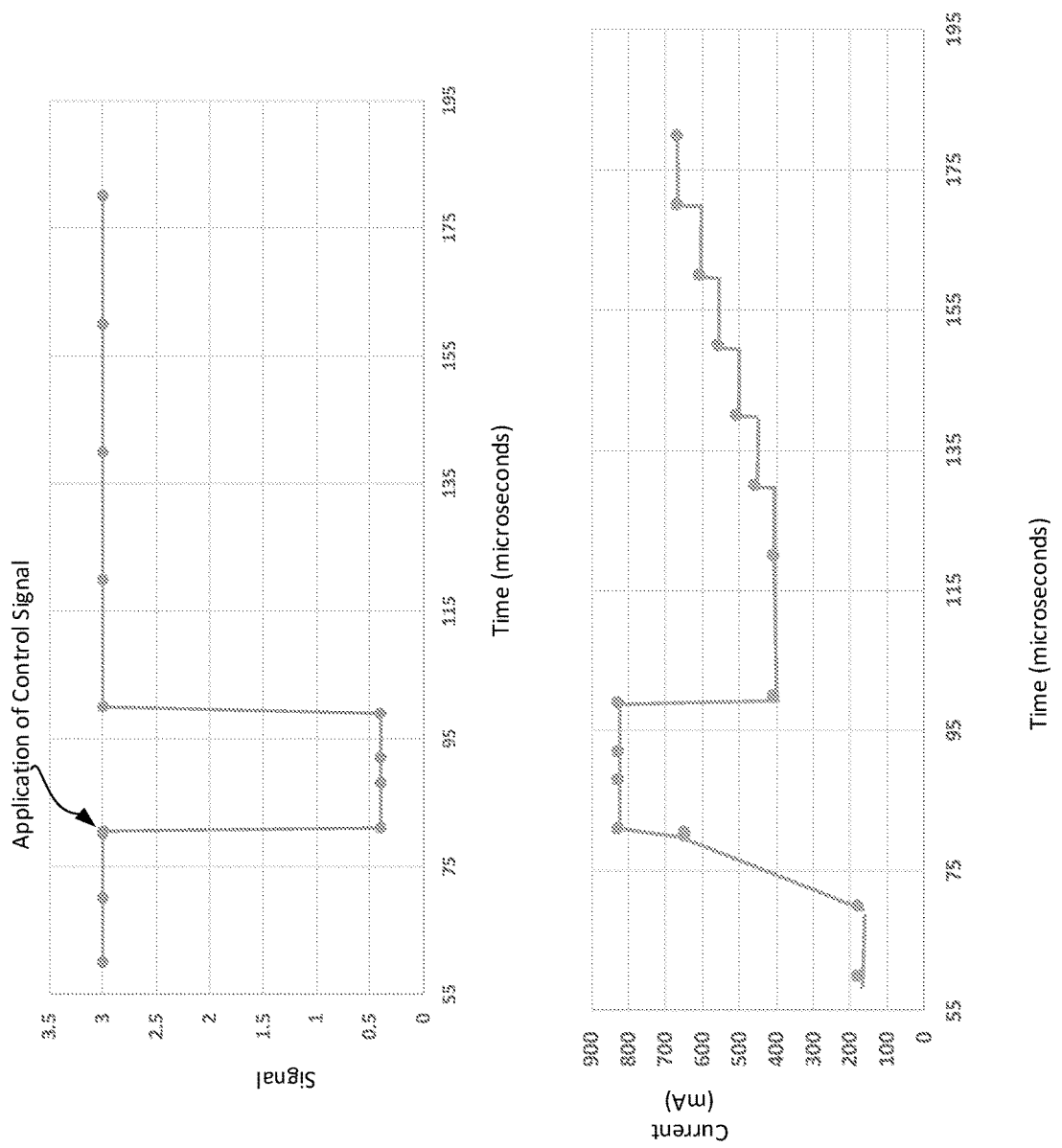
FIG. 6 is a diagram of a relationship between a control signal and current according to aspects of the disclosure.

FIG. 6 illustrates the application of a control signal, such as control signal 192, and the behavior of the current drawn by ML-ASIC 110 responsive to receipt of the control signal. Although not shown in FIG. 6, the current drops and steps are calibrated in the generated throttle mask to ensure that any resulting voltage spikes from the change in current are within parameters, and do not damage the ML-ASIC 110. As indicated in FIG. 6, the control signal may be applied at a particular time. Responsive to the application of this signal, the current being drawn or the current being used within the ML-ASIC will drop. After the control signal is released, the current is step-wise resumed, until a stable operating condition is again achieved. A person skilled in the art would recognize that although illustrated as a "drop" the control signal may be a "spike" or "increase" or a digital signal.

Through the use of a sequencer and a synchronizer, it is possible to integrate external signals, which are not part of the ASIC, to the internal clock of the ASIC. This enables minute and precise control of the ASIC, and allows for the ASIC to be used to its maximum capabilities, without running the risk of damaging the ASIC or losing data. In addition, by synchronizing the signals to the internal clock of the ASIC, it is possible to ensure that the signals being sent are "in-phase" with the current operating condition of the ASIC. Further, by combining signals which generate from within the ASIC, those from the voltage regulator, and optionally, other signals from outside both the ASIC and voltage regulator, it is possible to throttle the ASIC in a wider variety of situations and provide more robust operation of the ASIC.

According to some example methods, certain aspects of the above described apparatuses, systems, and methods may be configurable while others may be integrated into the ASIC during the time of fabrication and not changed. For example, a "resumed step time" value, which is how long the steps during the restoration of full power to the ASIC take, may be configurable. In one example, a recommended or default value may be programmed into the ASIC. In other examples, a minimum value may be hardwired and be immutable in the ASIC or voltage regulator. Other parameters, such as a minimum and maximum current or power, the number of steps, or priority of processing may be programmed or immutably set in the system.

In some examples, the various components described herein can be implemented by one or more components capable of performing multiple functions. For example, the synchronizer 130, chip manager 140, sequencer 180, and processor 161 may all be a single physical component. In another example, the synchronizer 130 and chip manger 140 may be implemented using a single component.

In other examples, it is possible to "stress-test" the ASIC after its fabrication using the methods described herein, and to select a subset of the most appropriate throttling masks based on the performance characteristics and requirements of the ASIC. This information may be stored in the voltage regulator 191 for example. In yet other embodiments, it is possible that the generated masks are no longer as appropriate as the ASIC ages or certain processors, circuits, or other components burn out or wear. It is then possible to configure the system to routinely update or generate additional throttling masks at times when the ASIC is at idle.

Further, this disclosure may be applicable across a variety of ASICs without the specific architecture of the ASIC limiting the applicability of this disclosure.

While this specification contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A method of regulating power usage of an integrated circuit (IC) comprising:
   receiving, by a synchronizer of the IC, a signal indicating an over current condition in the IC;
   synchronizing, by the synchronizer, the signal to an internal clock domain of the IC to produce a synchronized signal in phase with the internal clock of the IC;
   providing, by the synchronizer, the synchronized signal to a sequencer of the IC, the sequencer controlling a flow of instructions to be processed by the IC;
   receiving, by the sequencer, the synchronized signal; and
   reducing, by the sequencer in response to the received synchronized signal, the flow of instructions to limit a processing rate of the IC according to a throttling mask, the throttling mask limiting a rate of data to be processed by the IC.

2. The method of claim 1, wherein the signal indicating the over current condition is received by the synchronizer via a dedicated communication line.

3. The method of claim 1, further comprising generating, by a chip manager of the IC, the throttling mask based on the signal indicating the over current condition.

4. The method of claim 1, further comprising measuring, by a voltage regulator, a current load of the IC.

5. The method of claim 4, further comprising:
   determining, by the voltage regulator, the current load meets a threshold level indicating the over current condition; and
   providing, by the voltage regulator, the signal indicating the over current condition to the synchronizer.

6. The method of claim 4, further comprising:
   determining, by the voltage regulator, the current load no longer meets a threshold level indicating the over current condition; and
   providing, by the voltage regulator, a second signal indicating no over current condition to the sequencer.

7. The method of claim 6, further comprising restoring, by the sequencer, the flow of instructions to no longer limit a processing rate of the IC.

8. An integrated circuit (IC) comprising:
   a synchronizer configured to:
      receive a signal from a voltage regulator indicating an over current condition in the IC; and
      synchronize the signal to an internal clock domain to produce a synchronized signal in phase with the internal clock; and
   a sequencer for controlling a flow of instructions to be processed by the IC, the sequencer configured to:
   receive the synchronized signal; and
   in response to the synchronized signal, reduce the flow of instructions to limit a processing rate of the IC according to a throttling mask, the throttling mask limiting a rate of data to be processed by the IC.

9. The IC of claim 8, wherein the signal indicating the over current condition is received by the synchronizer via a dedicated communication line.

10. The IC of claim 8, further comprising a chip manager configured to generate the throttling mask based on the signal indicating the over current condition.

11. The IC of claim 8, further comprising the voltage regulator, the voltage regulator configured to measure a current load of the IC.

12. The IC of claim 11, wherein the voltage regulator is further configured to:
   determine the current load no longer meets a threshold level indicating the over current condition; and
   provide a second signal indicating no over current condition to the sequencer.

13. The IC of claim 12, wherein the sequencer is further configured to restore the flow of instructions to no longer limit a processing rate of the IC.

14. The IC of claim 11, wherein the voltage regulator is further configured to:
   determine the current load meets a threshold level indicating the over current condition; and
   provide the signal indicating the over current condition to the synchronizer.

15. A system comprising a voltage regulator and an integrated circuit (IC) coupled to the voltage regulator, wherein:
   the voltage regulator is configured to:
      measure a current load of the IC;
      determine the current load meets a threshold level indicating an over current condition in the IC; and
      provide a signal indicating the over current condition in the IC to the IC; and
   the IC is configured to:
      receive, by a synchronizer of the IC, the signal indicating the over current condition in the IC;
      synchronize, by the synchronizer, the signal to an internal clock domain to produce a synchronized signal in phase with the internal clock;
      provide, by the synchronizer, the synchronized signal to a sequencer of the IC, the sequencer controlling a flow of instructions to be processed by the IC; and
      reduce, by the sequencer in response to the synchronized signal, the flow of instructions to limit a processing rate of the IC according to a throttling mask, the throttling mask limiting a rate of data to be processed by the IC.

16. The system of claim 15, wherein the IC is further configured to generate, by a chip manager, the throttling mask based on the signal indicating the over current condition.

17. The system of claim 15, wherein:
   the voltage regulator is further configured to:
      determine the current load no longer meets the threshold level indicating the over current condition; and
      provide a second signal indicating no over current condition to the sequencer; and
   the IC is further configured to restore, by the sequencer, the flow of instructions to no longer limit a processing rate of the IC.

* * * * *